Dec. 14, 1954  R. S. REAVES ET AL  2,696,773
TRACTOR MOUNTED IMPLEMENT
Filed Nov. 16, 1951  3 Sheets-Sheet 3

Inventors
Robert S. Reaves
Laurel R. Yeske
by
Attorney

United States Patent Office 2,696,773
Patented Dec. 14, 1954

2,696,773

TRACTOR MOUNTED IMPLEMENT

Robert S. Reaves, West Salem, Wis., and Laurel R. Yeske, La Crescent, Minn., assignors to Allis-Chalmers Manufacturing Company, Milwaukee, Wis.

Application November 16, 1951, Serial No. 256,758

9 Claims. (Cl. 97—46.07)

This invention relates generally to the mounting of implements on a tractor, and it is more particularly concerned with a tractor implement combination wherein forward ground engaging tools are positioned at opposite sides of the tractor body and forwardly of the rear driving wheels, and wherein additional ground engaging tools are positioned to the rear of the tractor and are normally operated in conjunction with the forward tools.

In agricultural machines in which front and rear implements are mounted on a tractor as outlined hereinabove, the nature of the tools and of the work to be performed may make it desirable to provide for free floating movement of the front and rear tools relative to the tractor and to each other. Also, when the machine comes to the end of a row, it is usually desirable that the tools be lifted in sequence so that the forward tools and the rearward tools may leave the ground on the same line at the end of the field.

Variations in soil conditions and in the ground contour also may make it desirable to provide a method of mounting forward and rearward tools so that they will respond to fluctuations in working load to actuate a lifting device which will change the working depth of the tools an amount proportional to the increase or decrease in load and thereby maintain a constant load on the tractor at all times.

Generally, it is an object of this invention to provide a tractor implement combination wherein tools are mounted at the front and at the rear of the tractor and which incorporates all of the hereinbefore outlined desirable features.

One of the more specific objects of this invention is to provide a tractor implement combination wherein front and rear tools and an associated lift mechanism are arranged in such a manner that the front tools at the opposite sides of the tractor and the rear tools may float up and down relative to the tractor and independently of each other without impediment by the lift mechanism.

A further object of this invention is to provide a tractor implement combination of the hereinabove outlined character in which the lift mechanism is automatically controlled to maintain a substantially constant draft load on the tractor.

A still further object of the invention is to provide an improved implement lift mechanism which may be used with front and rear mounted draft regulated implements, and which provides for sequential lifting and lowering of the front and rear tools so that, in approaching the end of a row, the rear tools may be raised from the ground subsequently to the raising of the front tools, and so that at the start of a new row the rear tools may be lowered subsequently to the lowering of the front tools.

The foregoing and other objects and advantages are attained by the present invention, various novel features of which will be apparent from the description herein and the accompanying drawings disclosing an embodiment of the invention, and will be more particularly pointed out in the appended claims.

Figure 1:
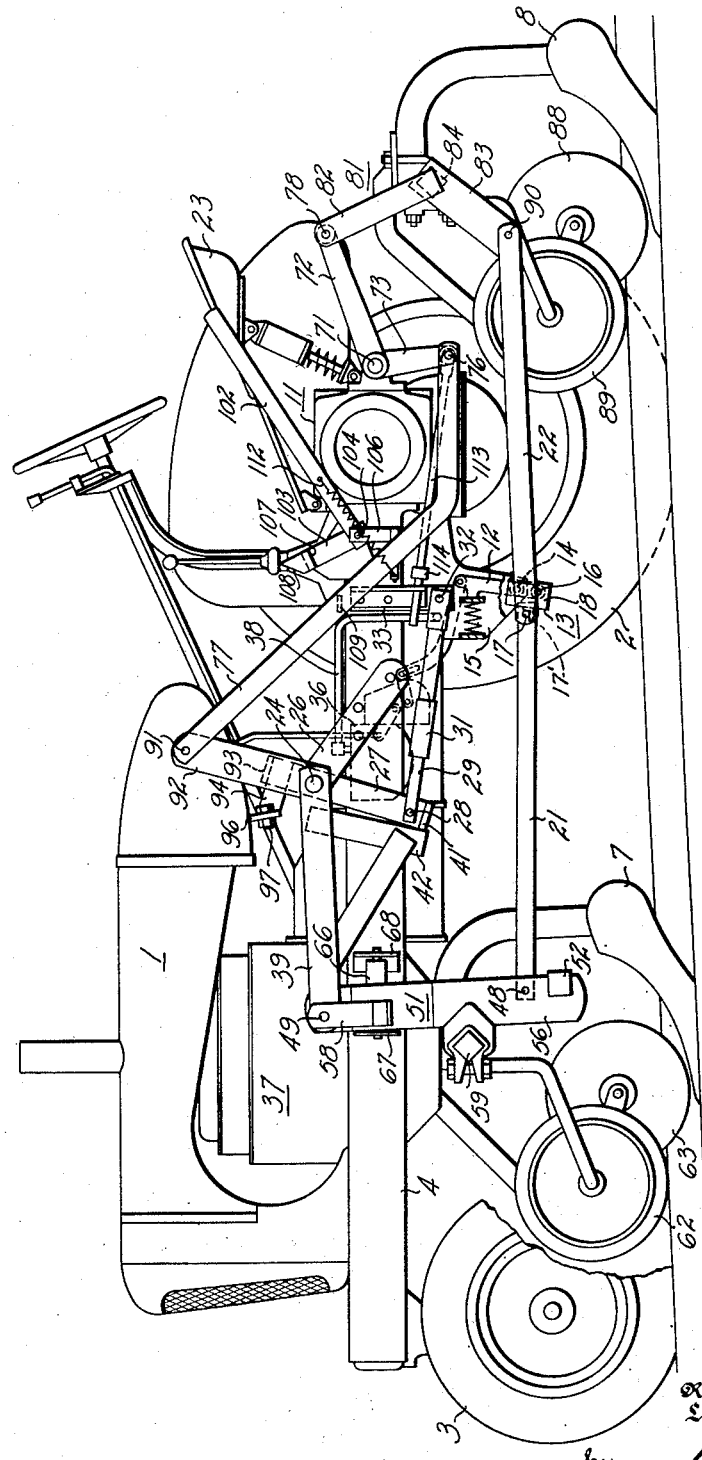
Fig. 1 is a side elevation of a tractor implement combination which embodies the present invention and which has the near rear wheel removed for purposes of exposure.
Figure 2:
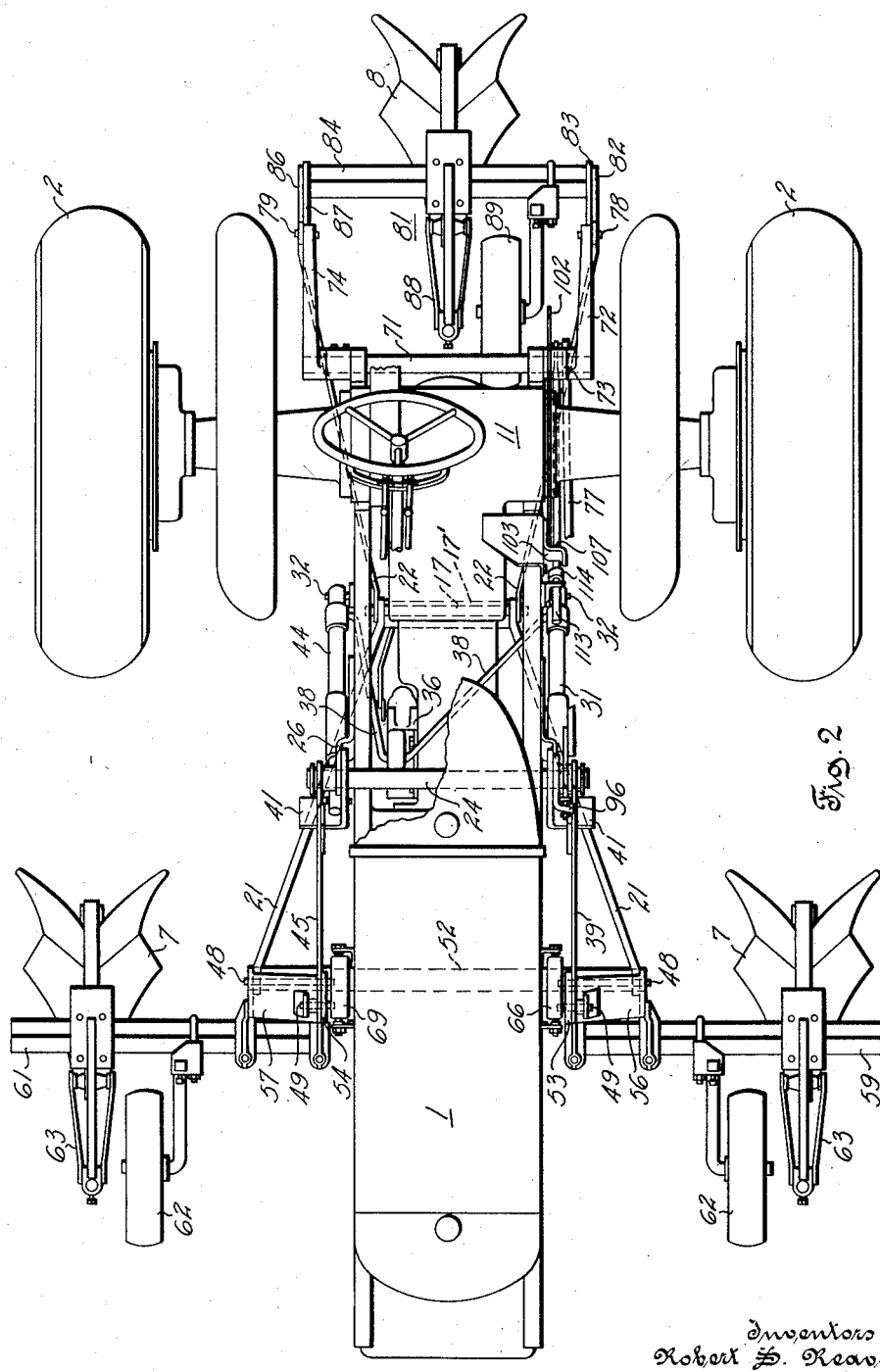
Fig. 2 is a plan view of the tractor implement combination shown in Fig. 1 with upper portions of the tractor omitted.

Referring to Figs. 1 and 2 of the drawings, the apparatus chosen to illustrate the present invention comprises a tractor 1 having a pair of rear driving wheels 2 and front dirigible wheels 3 supporting a tractor main frame 4, and implements including a pair of front mounted bedders 7 and a rear mounted bedder 8.

Mounted forward of and below the rear axle housing 11 of the tractor is a draft control arm 12 which, as will appear more fully hereinbelow, serves as part of a hitch means for connecting implements in draft transmitting relation to the tractor. Rigidly secured to the underside of the tractor is a bracket 15 on which the control arm 12 is pivotally mounted by means of a cross pin 14 for fore and aft swinging movement in response to changes in implement load. The control arm 12 actuates a control linkage of an automatic draft regulating apparatus in conformity with established principles as disclosed, for instance, in a copending application Serial No. 30,348, filed on June 1, 1948, by Walter F. Strehlow et al. for Power Lift Means Affording Depth Control and Sequential Raising and Lowering of Implements, now U. S. Patent 2,611,306, issued September 23, 1952.

Features of the tractor implement combination disclosed herein are claimed in the aforesaid Strehlow et al. application and also in application Serial No. 29,234 filed May 26, 1948, by Walter F. Strehlow for Lift Means Affording Depth Regulation of Tractor Propelled Implements.

A draft pin assembly, generally designated by the reference character 13 is attached to the draft control arm by means of pins 14 and 16 for fore and aft swinging movement with the control arm 12. The draft pin assembly consists of a draft pin 17 to which an angle shaped member 17' is rigidly attached. A pair of transversely spaced brackets 18 and 19 are rigidly attached to the angle shaped member 17'. The bracket 18 is provided with a pair of vertically spaced apertures which are in alignment with corresponding apertures in the other bracket 19 and also with vertically spaced transverse bores in the lower portion of the draft control arm 12. The aligned openings of the brackets and of the control arm 12 receive the pins 14 and 16, respectively, for detachably connecting the draft pin assembly 13 to the draft control arm 12. It will be noted that pin 14 performs the dual function of pivoting the control arm 12 on the bracket 15, and of securing the draft pin assembly 13 against pivotal movement about the pin 16 relative to the control arm 12. The ends of the draft pin 17 afford pivotal supports for the rear ends of a pair of lower push links 21, and also for the front ends of a pair of lower drag links 22.

Figure 3:
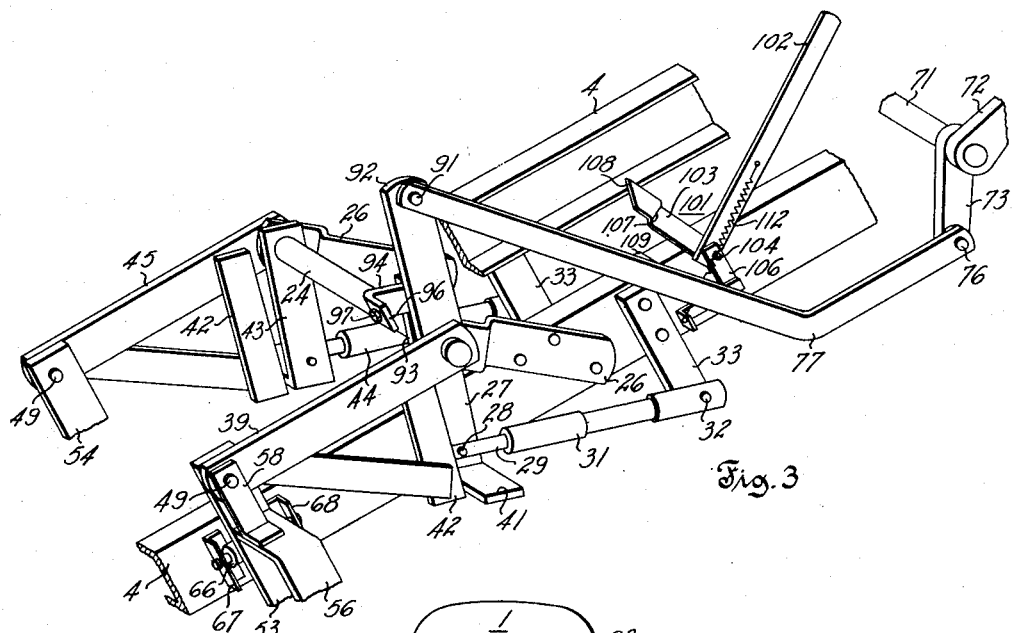
Fig. 3 is a partial perspective view of the front implement mounting structure and lifting mechanism shown in Figs. 1 and 2.

Mounted forwardly of the operator's station 23 on the tractor, and in overlying relation to the tractor main frame 4, is a transverse rock shaft or lift shaft 24 which is rotatably supported by a pair of straps 26 fixed, respectively, to opposite side channels of the tractor main frame. As best shown in Figs. 1 and 3, a lower lift arm 27 is rigidly attached to the lift shaft 24 in depending relation thereto at the left side of the tractor. The free end of the lower lift arm 27 has a pivotal connection 28 with the end of a piston rod 29 which forms part of a hydraulic ram 31. The cylinder part of the ram 31 is pivotally mounted on a pin 32 carried by a bracket 33 which is fixed to the left side channel of the tractor main frame. The piston rod 29 of the ram 31 may be actuated by admission of pressure fluid into the ram cylinder to swing the lower lift arm 27 forwardly and upwardly. Fluid for actuating the ram 31 is supplied by a hydraulic pump 36 which is indicated in Fig. 2 and which derives power from the tractor engine 37 in conventional manner. Pressure fluid is conducted from the pump 36 to the ram 31 through one of a pair of conduits 38.

The left end of the lift shaft 24 is axially extended outwardly beyond the lower lift arm 27 to provide a pivot on which is mounted a forwardly extending upper link or lift link 39. The lower portion of the lower lift arm 27 has a projection which extends outwardly from the tractor to form a finger 41 which is cooperable with an actuating arm 42 which is rigidly attached to and extends downwardly from the lift link 39. As the piston rod 29 of the ram is extended and the lower lift arm 27 swings forwardly and upwardly, the finger 41 which engages the actuating arm 42 at its rear surface causes the lift link 39 to swing upwardly with respect to the tractor on the axis of the lift shaft 24.

Figure 4:
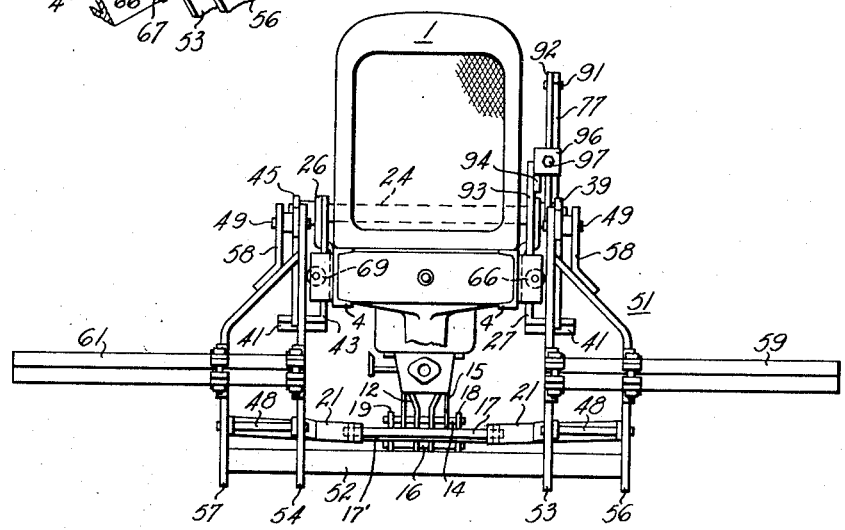
Fig. 4 is a front elevation of the front implement mounting structure shown in Figs. 1 and 2 with the tools and other parts omitted from the mounting structure.

A lift mechanism corresponding to the one shown in Fig. 1 at the left side of the tractor is mounted at the right side of the tractor as shown in Figs. 2, 3 and 4, and comprises a lower lift arm 43, a ram 44 and a lift link 45. The explanations hereinbefore regarding the construction and operation of the lift mechanism at the left side of the tractor similarly apply to the lift mechanism at the right side of the tractor. The lower lift arms 27 and 43 are rigidly attached to the lift shaft 24 for simultaneous movement with each other but the lift links 39 and 45 are pivotally mounted for movement independently of each other and of the lower lift arms.

Referring to Figs. 1 and 2, the forward ends of the push links 21 are pivotally connected by pins 48 to a forward implement mounting structure, generally designated by the reference character 51. In like manner, the forward ends of the lift links 39 and 45 are pivotally connected to the front implement mounting structure by means of pins 49. The push links 21, lift links 39 and 45 and associated parts represent means for positioning the front implement mounting structure 51 at the forward portion of the tractor for up and down movement with respect thereto.

The front implement mounting structure 51 consists of a bar 52 which extends transversely of and in underlying relation to the tractor main frame 4. As best shown in Fig. 4, two bracket structures 53, 56 and 54, 57 at opposite sides, respectively, of the tractor are rigidly attached to and extend upwardly from opposite ends of the bar 52 and are arranged in transverse alignment with each other. The two bracket structures comprise inner brackets 53 and 54 and outer brackets 56 and 57. The outer brackets 56 and 57 are bent inwardly and upwardly at their upper ends to join with and be rigidly secured to the upper ends, respectively, of the inner brackets 53 and 54. Straps 58 are rigidly secured, respectively, to the inwardly bent portions of the outer brackets 56 and 57. The straps 58 have apertures in alignment with apertures in the upper portions of the inner brackets 53 and 54, respectively, for receiving the pins 49 by means of which the bracket structures are pivotally connected, respectively, with the forward portions of the lift links 39 and 45. A tool mounting bar 59 extends outwardly at the left side of the tractor and is in axial alignment with a corresponding tool bar 61 at the right side of the tractor. The tool mounting bars 59 and 61 are rigidly secured to the bracket structure 53, 56 and to the bracket structure 54, 57, respectively, so that the transverse bar 52, the bracket structures and the tool bars 59 and 61 form a rigid structure. The bedder 7, a gauge wheel 62 and a coulter 63 are conventionally mounted on the tool bar 59 at the left side of the tractor forwardly of the left tractor rear wheel 2, and another bedder 7, a gauge wheel 62 and a coulter 63 are conventionally mounted on the tool bar 61 at the right side of the tractor forwardly of the right tractor rear wheel 2.

The pins 48 which pivotally connect the forward ends of the push links 21 to the front implement mounting structure are mounted on the outer brackets 56 and 57, respectively. Each push link 21 is bifurcated at its forward end as shown in Fig. 4, and the inner legs of the push links 21 are pivotally connected with the inner brackets 53 and 54, respectively, by the pins 48.

Referring to Fig. 1, a roller 66 is rotatably mounted on the tractor by two brackets 67 and 68 which are rigidly attached to the left side channel of the tractor main frame 4. A similar roller 69 is mounted in the same manner on the right side channel of the tractor main frame. The rollers 66 and 69 are disposed between the tractor main frame 4 and the inner brackets 53 and 54 to provide centering bearings for the front implement mounting structure 51.

A rear lift shaft 71 is rotatably supported on the tractor in transverse relation thereto and rearwardly of the rear axle housing 11. As best shown in Figs. 1 and 2, a bell crank consisting of a rearwardly extending arm 72 and a depending arm 73 is rigidly attached to the left end of the shaft 71 for turning movement therewith. The other end of the shaft 71 at the right side of the tractor rigidly mounts a rearwardly extending arm 74 which is in transverse alignment with the rearwardly extending arm 71 at the left side of the tractor. The free end of the depending arm 73 is pivotally connected by a pin 76 to the rear end of a fore and aft reciprocable link 77, and the free ends of the rearwardly extending arms 72 and 74 are pivotally connected, respectively, by pins 78 and 79 to the rear implement mounting structure, which is generally designated by the reference character 81.

The rear implement mounting structure 81 comprises a transverse rear tool bar 84 which has an upper bracket 82 and a lower bracket 83 rigidly attached to one of its ends at the left side of the tractor, and which has another upper bracket 86 and a lower bracket 87 rigidly secured to its other end at the right side of the tractor. The rear tool bar 84, the upper brackets 82 and 86 and the lower brackets 83 and 87 form a rigid frame structure for mounting and positioning a rear bedder 8, a coulter 88 and a gauge wheel 89. The lower brackets 83 and 87 are pivotally connected, respectively, with the drag links 22 at opposite sides of the tractor by pins 90.

The reciprocable link 77 extends forwardly and upwardly at the left side of the tractor as viewed in Fig. 1, and is pivotally connected by a pin 91 to the upper end of a guide link 92. The lower end of the guide link 92 is rotatably mounted on the lift shaft 24 for fore and aft swinging movement independently of the lift shaft 24, lower lift arms 27 and 43, and the lift links 39 and 45. The lower lift arm 27 at the left side of the tractor is upwardly elongated so as to extend above the lift shaft 24 and form an upper lift arm 93 to which an offset lug 94 is rigidly attached. As best shown in Fig. 3, the offset lug 94 has a transversely extending part 96 which mounts an adjustable screw 97. The head of the screw 97 moves into contact with the guide link 92 and swings it rearwardly upon extension of the arms 31 and 44 in tool raising direction.

A trip lever assembly, generally indicated in Fig. 3 by numeral 101 consists of a hand lever 102 which has a forwardly extending latch arm 103 rigidly secured thereto. The lever 102 is pivotally supported by a pin 104 on an angle bracket 106 which is rigidly secured to the left side channel of the tractor main frame 4. The latch arm 103 of the lever 102 is double bent outwardly and then forwardly near its forward end to form a transverse shoulder 107 thereon. A lug 109 is rigidly attached to a midportion of the reciprocable link 77 and extends inwardly toward the tractor. At its extreme forward end, the latch arm 103 has a sliding or inclined surface 108 for camming engagement with the lug 109 when the rear tools are raised from their lowered position while the hand lever occupies a forwardly tilted position, as will be explained more fully hereinbelow. The reciprocable link 77 is prevented from moving in rear tool lowering direction, that is forwardly, when the shoulder 107 occupies a blocking position ahead of the lug 109. An overcenter spring 112 which is connected at its upper end to the hand lever 102 and at its lower end to the bracket 106, serves to hold the lever in the position in which it is shown in Figs. 1 and 3, and also, if desired, to hold the lever in a forwardly adjusted position in which the shoulder 107 lies within the path of the lug 109.

As shown in Fig. 1, a stop rod 113 is pivotally connected by the pin 76 to the depending arm 73 of the rear rock shaft 71. The forward end of the stop rod is free to slide in an aperture of the bracket 33. A stop collar 114 is adjustably secured on the stop rod 113 to provide a stop when the collar comes into contact with the bracket 33. The stop rod 113 and collar 114 provide a means for limiting the working depth of the rear bedder 8, in particular, when a rear gauge wheel 89 is not used. Furthermore, the stop rod makes it possible to obtain automatic depth regulation of the rear implement as will be explained more fully hereinbelow.

The apertures in the rear ends of the links 39 and 45 which receive the lift shaft 24, and the apertures in the front ends of these links which receive the pins 49, as well as the apertures in the push links 21 which receive the pins 48 are made oversized so that loose pivotal connections are provided. These loose connections, in conjunction with the rollers 66 and 69, make it possible for the tractor to tilt to either side with respect to the front implement mounting structure 51.

In Fig. 1 the front and rear implement mounting structures 51 and 81 are shown in implement lowered positions. The lifting rams 31 and 44 which are mounted on opposite sides of the tractor and connected to the lower lift arms 27 and 43 may be actuated upon manual control of the hydraulic system by the tractor operator to bring about extension of the rams. The extension of the rams causes the lift arms 27 and 43 to rotate forwardly and upwardly. As the lift arms rotate, the fingers 41 at their lower portions push against the actuating arms 42 to bring about lifting of the front implement structure 51. Shortly after the front bedders 7 are lifted from the ground, the screw 97 of the upper lift arm 93 comes into contact with the guide link 92. Continued extension of the rams 31 and 44 and consequent rotation of the lower lift arms 27 and 43 and of the upper lift arm 93 causes the guide link 92 to be swung rearwardly. This rearward swinging of the guide link 92 causes the reciprocable link 77 to move rearwardly, thereby raising the rear bedder 8 to an inoperative position and eventually to a transport position.

During field operation, when the machine approaches the end of the field with the bedders 7 and 8 in operative ground engaging positions, the operator may by manual control of the hydraulic system cause rotation of the forward rock shaft 24 in implement raising direction so that the forward implement mounting structure 51 will be raised and, as the tractor moves forwardly, the screw 97 on the upper lift arm 93 will engage with guide link 92 and bring about the subsequent lifting of the rearward implement mounting structure 81. As a result of such sequential lifting, the front bedders 7 and the rear bedder 8 will be raised on the same transverse line. The adjustable screw 97 on the upper lift arm 93 permits adjustment of the time interval in the lifting of the front and rear tools.

The hand lever 102 is normally maintained by the spring 112 in a forwardly adjusted position so that, as the rear bedders are lifted, the projecting lug 109 on the reciprocable link 77 will come into camming engagement with the inclined surface 108 on the latch arm 103. Continued rearward motion of the reciprocable link 77 will bring about a positioning of the projecting lug 109 to the rear of the shoulder 107 on the latch arm 103. When the rear implement mounting structure 81 is raised to an inoperate position, the weight of the structure has a tendency to move the reciprocable link 77 forwardly. However, the engagement of the shoulder 107 of the latch arm 103 with the projecting lug 109 on the reciprocable link 77 prevents the implements from returning to a ground working position until the operator manually releases the reciprocable link 77 by rearward adjustment of the lever 102 to the position in which the lever is shown in Figs. 1 and 3.

In returning the bedders 7 and 8 to a ground engaging position, the operator, by a manual control of the hydraulic system, causes the extensible rams 31 and 44 to contract thereby permitting the front implement mounting structure 51 to descend. When it is desired that the rear bedder be lowered to an operative position it is necessary that the operator manually release the reciprocable link 77 from its locked condition by moving the lever 102 rearwardly, thereby moving the shoulder 107 out of engagement with the lug 109. This makes it possible for the operator to manually achieve a sequential lowering of the front and rear implements to ground working positions.

Referring to Fig. 1, it will be noted that when the machine is operated with the front bedders 7 and the rear bedder 8 in ground engaging positions, draft force will be transmitted to the draft control arm 12 through the push links 21 and also through the drag links 22. Variations of the soil resistance encountered by the bedders will therefore be transmitted to the control arm 12 of the automatic draft control apparatus. Increases and reductions in the working load will cause the control arm 12 to be pivoted in opposite directions, and as a result the hydraulic system will be automatically actuated to admit pressure fluid from the pump 36 to the rams 31 and 44 or to permit emission of pressure fluid from the rams. For example, as an obstruction is encountered by either of the front bedders, the load is transmitted to the automatic draft control linkage. This causes extension of the rams 31 and 44 a predetermined amount which is proportional to the increase of the working load imposed upon the tractor. The extension of the rams cause the front bedders to be lifted a slight amount so that the draft is decreased to the desired predetermined amount. Actuation of the rams to raise the front bedders to compensate for draft increase does not bring about automatic lifting of the rear bedder 8. However, in implements of this type where three bottoms are used, it is common to space the rear wheels 2 of the tractor so that they run in the furrows of the forward bedders 7. If the stop rod 113 is used to limit the working depth of the rear bedder 8, any depth regulation of the front bedders 7 will indirectly affect the rear bedder 8. For example, if an area of firm soil is encountered which causes the draft load to increase on all three bedders, all three will cause actuation of the control arm 12 and therefore of the automatic draft regulating apparatus. Only the front bedders will directly respond to the extension of the rams 31 and 44. However, the extension of the rams will cause the furrows formed by the front bottoms 7 to become shallower, and when the rear wheels 2 of the tractor ride up on the shallower furrows, they will cause the rear bedder 8 to be raised an amount equal to the raising of the rear wheels of the tractor.

From the foregoing it will be seen that all three bedders are operative to actuate the automatic draft control apparatus but only the front tools respond directly to extension of the hydraulic rams. The rear tools respond indirectly through the raising of the rear wheels of the tractor.

In operation in the field, when one of the forward gauge wheels 62 or the rearward gauge wheel 89 rides over a hump or similar obstacle, the associated implement mounting structure will be free to raise or float upwardly with the gauge wheel. It should be noted that none of the linkages required for draft regulation or sequential lifting obstructs in any way the free floating movement of the front and rear implement mounting structures. The range of free floating of the implement mounting structures extends from lowered working positions to the raised transport positions. Furthermore, the front and rear implement mounting structures 51 and 81 are free to float independently of each other. In rough ground, the lever 102 is kept in its inoperative position in which it is shown in Figs. 1 and 3 so that when the rear bedder 8 floats upwardly, the shoulder 107 does not engage with the lug 109 to prevent return of the rear bedder to its normal lowered position.

As stated hereinbefore, the pivot connections of the lift links 39 and 45 to the front implement mounting structure 51 and to the lift shaft 24, as well as the pivotal connections of the push links 21, are fitted loosely so as to permit the tractor to assume a somewhat laterally tilted position with respect to the front implement mounting structure 51. This arrangement permits the bedders 7 to maintain their proper depth even though the tractor is caused to tilt by changes in contour of the ground.

If at any time one of the front bedders should begin to make a shallower furrow than the other front bedder, the front implement mounting structure will be caused to tilt with respect to the tractor. Such tilting will cause the actuating arm 42 of the lift link 39 or 45, as the case may be, to move out of contact with the finger 41 of the lower lift arm on the respective side of the tractor. For example, when the bedder 7 on the left side of the tractor, as viewed in Fig. 1, is low with respect to the bedder on the right side of the tractor, the push arm 42 at the right side of the tractor will disengage from the finger 41 on the lower lift arm 43 on the right side of the tractor. With the bedders in this position, any increase in draft load will actuate the automatic draft control apparatus to bring about an extension of the rams 31 and 44. As the rams extend, the lower lift arms 27 and 43 swing forwardly but only the bedder on the left side of the tractor will be raised. Raising of the bedder on the left side of the tractor will continue until both front bedders are at the same depth. This is so because the finger 41 and the push arm 42 are engaged with each other only on the left side of the tractor. After the working depths of both front bedders 7 have become equal, any further movement of the lower lift arms 27 and 43 will affect both bedders in the same manner.

It should be understood that it is not intended to limit the invention to the particular forms and details herein disclosed, and that the invention includes such other forms and modifications as are embraced by the scope of the appended claims.

It is claimed and desired to secure by Letters Patent:

1. The combination of a tractor, a front implement mounting structure, a rear implement mounting structure, a double armed lift lever pivoted on said tractor for back and forth swinging movement in implement lowering and implement raising directions, an upper link pivoted on said tractor coaxially with said lift lever and having a forward end portion pivotaly connected with said front implement mounting structure, a pair of lower links mounted on said tractor for swinging movement relative thereto and relative to each other on a pivot center in downwardly spaced relation to the pivot center of said lift lever, pivot means connecting said lower links, respectively, with said front and rear implement mounting structure, a rearward rocker arm pivoted on said tractor and being operatively connected in lift force transmitting relation with said rear implement mounting structure, a one-way actuating connection between one arm of said lift lever and said upper link, and another one-way actuating connection between the other arm of said lift lever and said rearward rocker arm, said actuating connections being operative to raise said front and rear implement mounting structures upon rotation of said lift lever in said implementing raising direction.

2. In combination with a tractor having a main body and a draft element operatively connected with and depending from a rearward portion of said main body, a double armed lift lever mounted for rocking movement on an axis extending transversely of said main body between the front and rear ends of the latter and in elevated relation to said draft element, a front tool mounting structure, a forward link system including a lower and an upper link pivoted, respectively, on said draft element and on said axis for positioning said front tool mounting structure at and in vertically adjustable relation to a forward portion of said tractor main body, a rear tool mounting structure, a rearward link system including a draft transmitting link pivoted on said draft element and extending rearwardly therefrom for positioning said rear tool mounting structure rearwardly of and in vertically adjustable relation to said tractor main body, a lift force transmitting element operatively connected with said forward link system for cooperative engagement with one arm of said lift lever upon swinging movement of the latter in implement raising direction and movable away from said one arm of said lift lever upon self-adjustment of said front tool mounting structure upwardly relative to said tractor, and means affording a one-way actuating connection between the other arm of said lift lever and said rearward link system and operable to raise said rear tool mounting structure upon swinging movement of said lift lever on said axis in said implement raising direction.

3. In combination with a tractor having a main body and a draft element operatively connected with and depending from a rearward portion of said main body, a rock shaft mounted on and extending transversely of said tractor main body between the front and rear ends of the latter and in elevated relation to said draft element, a pair of front implement lift levers rigidly connected with said rock shaft at opposite sides, respectively, of said tractor main body, said front implement lift levers being adjustable to implement lowered positions in depending relation to the axis of said rock shaft and being swingable forwardly from said implement lowered position upon rotation of said rock shaft in implement raising direction, a front implement mounting structure extending transversely of said tractor main body at opposite sides of the latter, a pair of link systems at opposite sides, respectively, of said tractor main body and each including a lower and an upper link pivoted, respectively, on said draft element and on said rock shaft for positioning said front implement mounting structure at and in vertically adjustable relation to a forward portion of said tractor main body, a pair of actuating arms rigidly connected, respectively, with said upper links and having end portions forwardly of and in abuttable relation to said lift levers, respectively, so that self-adjustment of said front implement mounting structure upwardly and downwardly relative to said tractor main body will move said end portions of said actuating arms out of and into cooperative engagement, respectively, with said lift levers, a rear implement mounting structure, a rearward link system connected with said tractor for positioning said rear implement mounting structure at and in vertically adjustable relation to a rearward portion of said tractor main body, a rear implement lift lever rigidly secured to said rock shaft, and a one-way actuating connection between said rear implement lift lever and said rear implement mounting structure and operative to raise said rear implement mounting structure upon rotation of said rock shaft in said implement raising direction.

4. The combination of a tractor, a front implement mounting structure, a rear implement mounting structure, a double armed lift lever pivoted on said tractor for back and forth swinging movement in implement lowering and implement raising directions, an upper link pivoted on said tractor coaxially with said lift lever and having a forward end portion pivotally connected with said front implement mounting structure, a pair of lower links mounted on said tractor for swinging movement relative thereto and relative to each other on a pivot center in downwardly spaced relation to the pivot center of said lift lever, pivot means connecting said lower links, respectively, with said front and rear implement mounting structures, a rearward rocker arm pivoted on said tractor and being operatively connected in lift force transmitting relation with said rear implement mounting structure, a reciprocable link operatively connected at one of its ends with said rearward rocker arm for rotating the latter in tool raising direction upon rearward movement of said reciprocable link relative to said tractor, a guide link pivotally connected with the other end of said reciprocable link and pivoted on said tractor concentrically with said lift lever, a one-way actuating connection between one arm of said lift lever and said upper link, and another one-way actuating connection between the other arm of said lift lever and said guide link, said actuating connections being operative to raise said front and rear implement mounting structures upon rotation of said lift lever in said implement raising direction.

5. The combination of a tractor, a front implement mounting structure, a rear implement mounting structure, a double armed lift lever pivoted on said tractor for back and forth swinging movement in implement lowering and implement raising directions, an upper link pivoted on said tractor coaxially with said lift lever and having a forward end portion pivotally connected with said front implement mounting structure, a pair of lower links mounted on said tractor for swinging movement relative thereto and relative to each other on a pivot center in downwardly spaced relation to the pivot center of said lift lever, pivot means connecting said lower links, respectively, with said front and rear implement mounting structures, a rearward rocker arm pivoted on said tractor and being operatively connected in lift force transmitting relation with said rear implement mounting structure, a reciprocable link operatively connected at one of its ends with said rearward rocker arm for rotating the latter in tool raising direction upon rearward movement of said reciprocable link relative to said tractor, a guide link pivotally connected with the other end of said reciprocable link and pivoted on said tractor concentrically with said lift lever, a manually operable latch member pivoted on said tractor and cooperable with said reciprocable link for releasably locking said rearward rock arm against rotation in tool lowering direction, a one-way actuating connection between one arm of said lift lever and said upper link, and another one-way actuating connection between the other arm of said lift lever and said guide link, said actuating connections being operative to raise said front and rear implement mounting structures upon rotation of said lift lever in said implement raising direction.

6. The combination of a tractor, a rear implement mounting structure, a rearward rocker arm pivotally connected with said tractor and operatively connected in lift force transmitting relation with said rear implement mounting structure, a link member extending forwardly from said rear implement mounting structure under and pivotally connected at its forward end with said tractor, a lift lever pivoted on said tractor forwardly of said rearward rocker arm for back and forth swinging movement in implement raising and implement lowering directions, a guide link mounted on said tractor for pivotal movement coaxially with and relative to said lift lever, a fore and aft reciprocable link pivotally connected at its forward end with said guide link and operatively connected at its rearward end with said rearward rocker arm so as to raise said rear implement mounting structure upon rearward swinging movement of said reciprocable link, and a one-way actuating connection between said lift lever and said guide link operative to impart rearward movement to said reciprocable link upon swinging movement of said lift lever in said implement raising direction.

7. The combination set forth in claim 6 and further comprising a manually releasable latch mechanism operable to lock said reciprocable link against forward movement upon adjustment of said rear implement mounting structure to an elevated position relative to said tractor.

8. The combination set forth in claim 7 and further comprising a biasing spring associated with said latch latch mechanism in locking condition.

9. The combination set forth in claim 8 and further comprising cam means associated with said reciprocable link and with said latch mechanism and operative to automatically establish a locking connection between said reciprocable link and said latch mechanism upon said adjustment of said rear implement mounting structure to an elevated position relative to said tractor.

References Cited in the file of this patent

UNITED STATES PATENTS

| Number | Name | Date |
| --- | --- | --- |
| 2,302,502 | Morkoski et al. | Nov. 17, 1942 |
| 2,324,840 | Hipple | July 20, 1943 |
| 2,352,281 | Mott | June 27, 1944 |
| 2,361,122 | Raney et al. | Oct. 24, 1944 |
| 2,362,578 | Mott | Nov. 14, 1944 |
| 2,611,306 | Strehlow et al. | Sept. 23, 1952 |